Nov. 4, 1930.　　　　　A. BLUM　　　　　1,780,740
KNOTTING DEVICE FOR MACHINES FOR MANUFACTURING KNOTTED CARPETS
Filed July 25, 1928　　6 Sheets-Sheet 1

Inventor
Albert Blum
By Serrell Son
his Attorneys

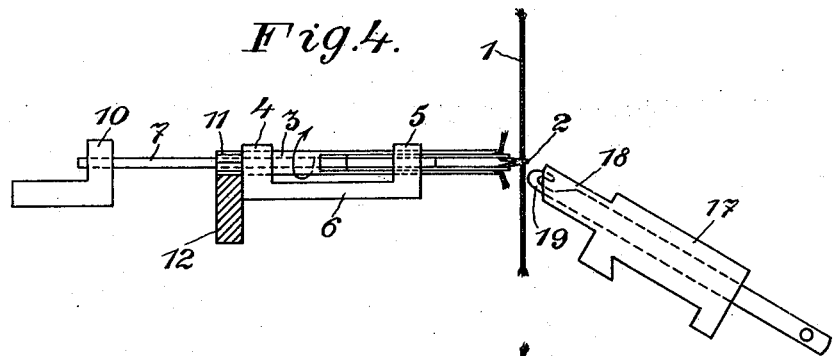
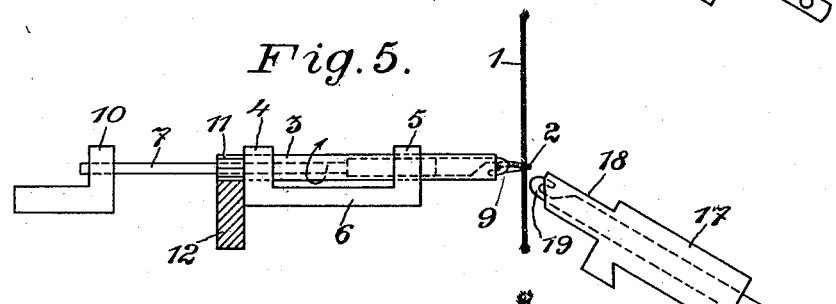
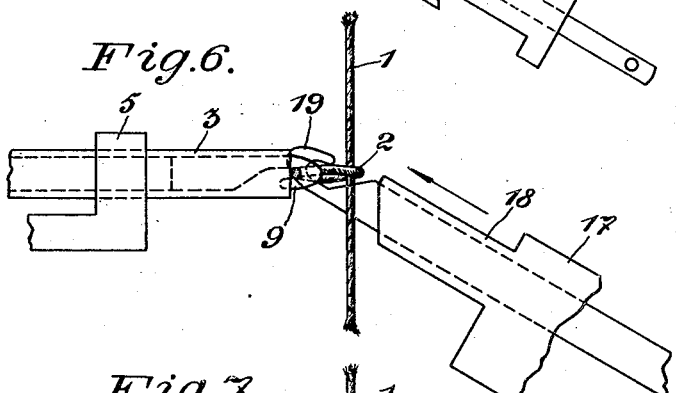
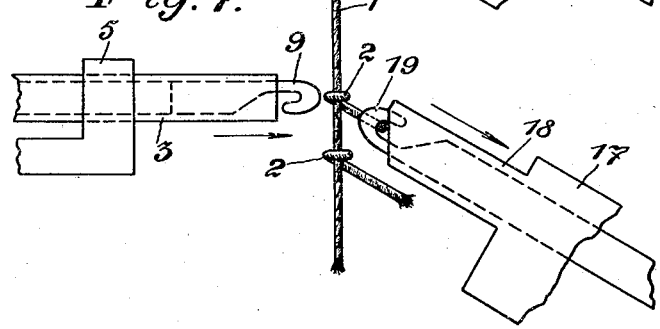

Nov. 4, 1930.  A. BLUM  1,780,740
KNOTTING DEVICE FOR MACHINES FOR MANUFACTURING KNOTTED CARPETS
Filed July 25, 1928    6 Sheets-Sheet 3
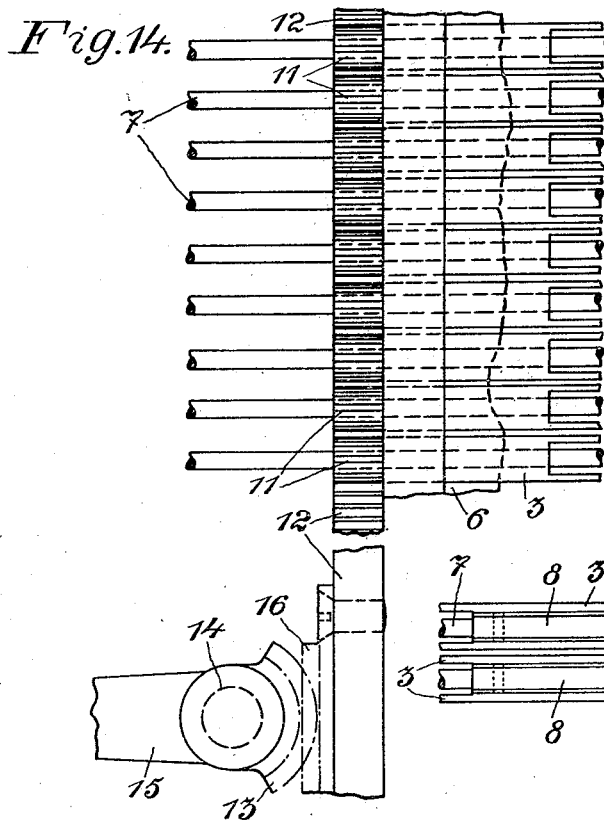
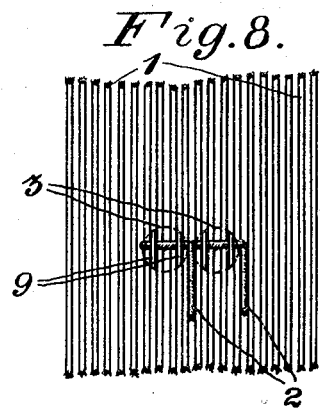
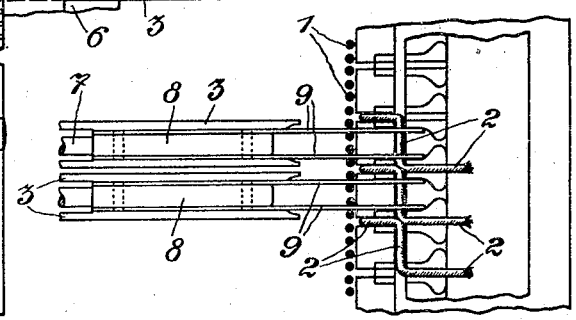
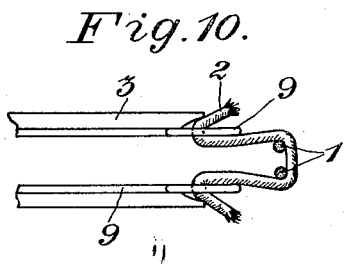
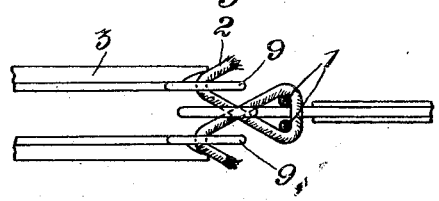
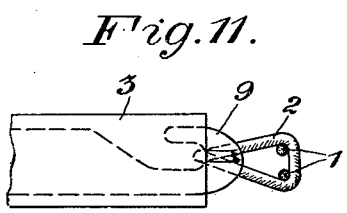
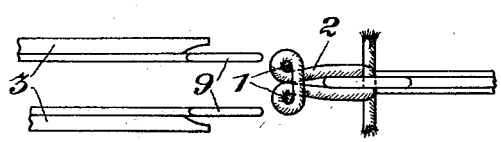
Inventor
Albert Blum
By his Attorneys

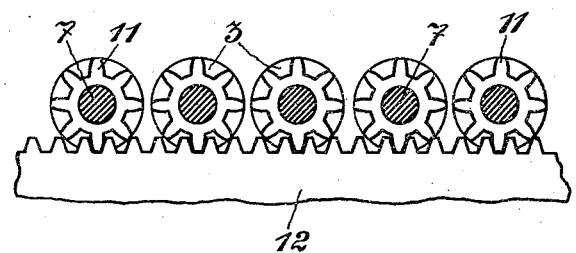
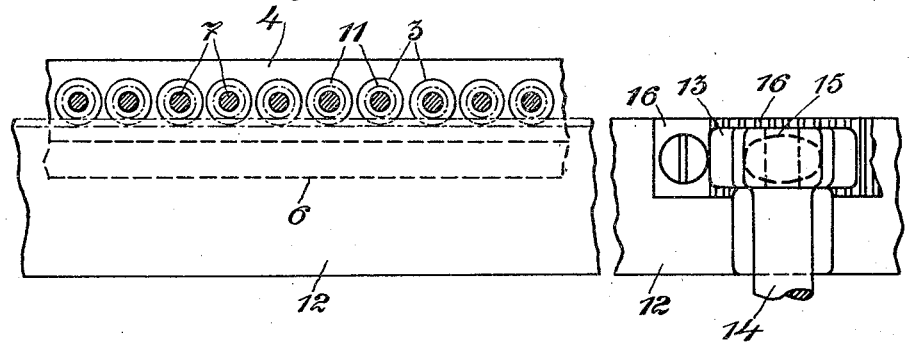

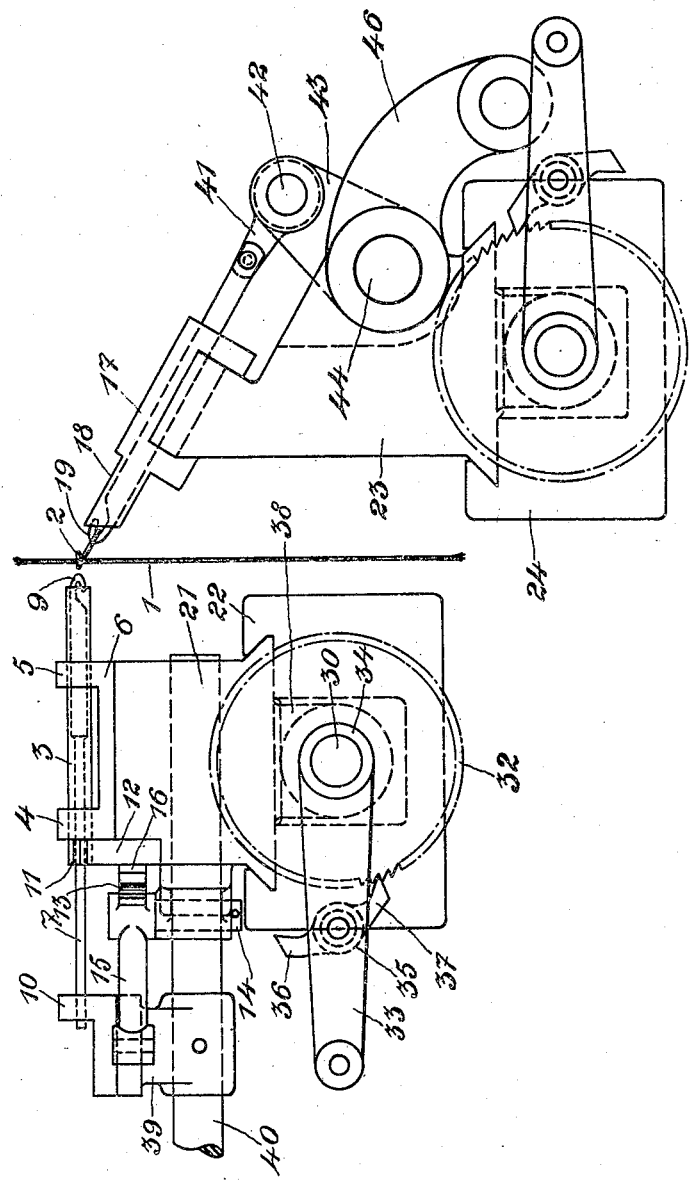

Patented Nov. 4, 1930

1,780,740

UNITED STATES PATENT OFFICE

ALBERT BLUM, OF RAPPERSWIL, SWITZERLAND, ASSIGNOR, BY MESNE ASSIGNMENTS, TO AKTIENGESELLSCHAFT FÜR MECHANISCHE KNÜPFTEPPICHE SYSTEM BOYER, OF ZURICH

KNOTTING DEVICE FOR MACHINES FOR MANUFACTURING KNOTTED CARPETS

Application filed July 25, 1928, Serial No. 295,313, and in Switzerland May 7, 1928.

Knotting devices as heretofore employed in knotted carpet machines have two material disadvantages.

The tongshaped knotting devices generally used require a relatively large space and for this reason are inapt for simultaneously making groups of knots, they are necessarily arranged at certain distances one from the other and are adjustable over a given warp thread row making it possible to cause the same to successively tie pile knots.

Other knotting devices which upon first sight appear adaptable for making pile knots in groups are provided with hookshaped knotting members which, however, are operated with very complicated movements for knotting the pile thread.

In both of these known types of devices many technical disadvantages are inherent which limit their possibility of application and their reliability in the knotting operation.

In the present invention the knotting device is constructed in such a manner that from the two movements which both catcher and knotter tools are compelled to make in working, at least the movement of one of these tools is limited to a single forward and backward motion. In the working example to be described hereinafter the operating motions of both the catcher and the knotter are limited to a single forward and backward motion.

It is evident that under such conditions a greater speed and more reliable operation, a saving of time and a larger output will be obtained than with known devices which require a number of such motions of the fundamental members, such as the catcher and the knotter.

A particular advantage of the knotting device made in accordance with my present invention resides in the fact that the catchers which are arranged relatively close together and which are adjustable above a plurality of warp threads, are adapted both for the manufacture of the pile knots in groups simultaneously and for their manufacture successively, without modifying the movements of the knotting device in changing from one kind of manufacture to the other.

The attached drawings show by way of example one working form of the invention.

Figure 1:
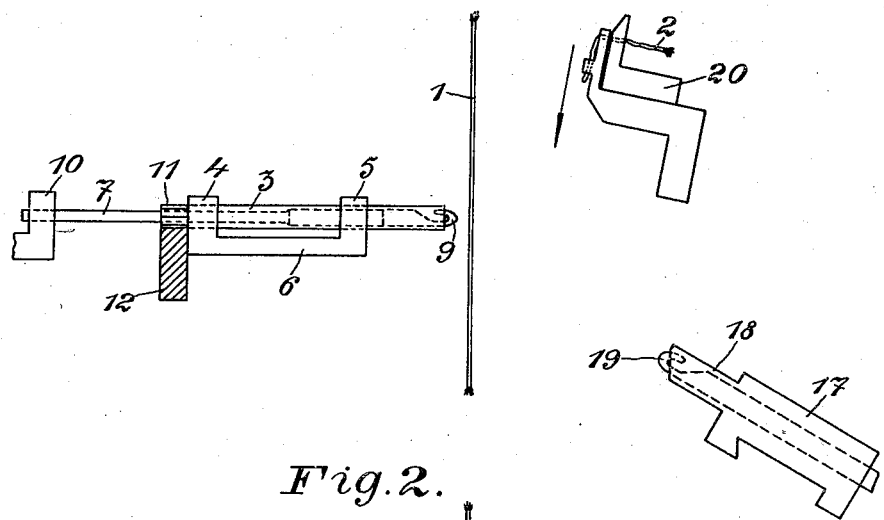
Figure 2:
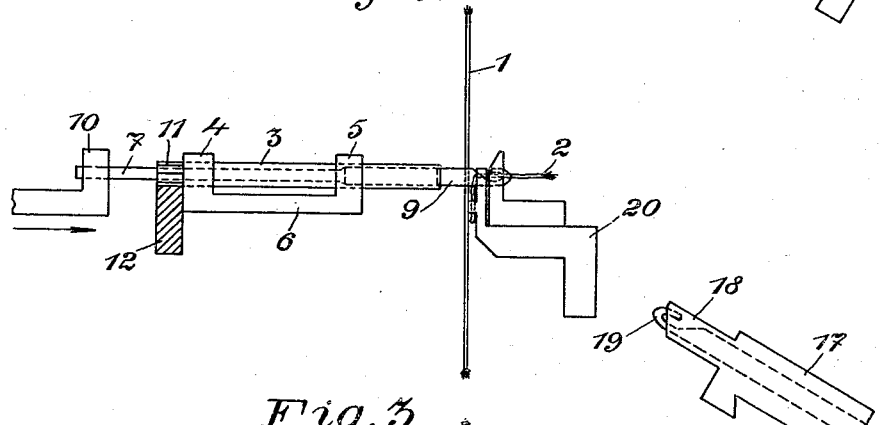
Figure 3:
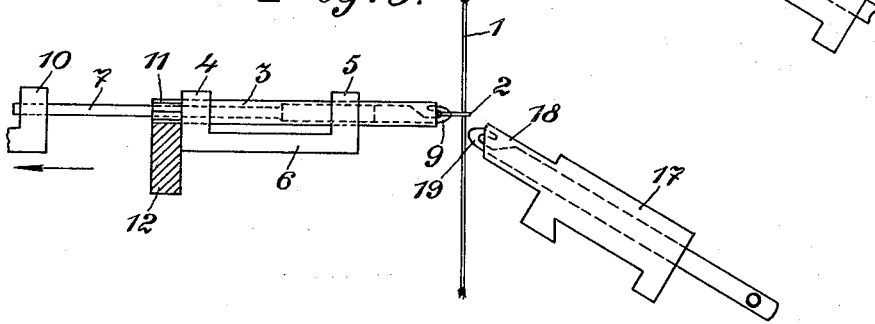
Figure 18:
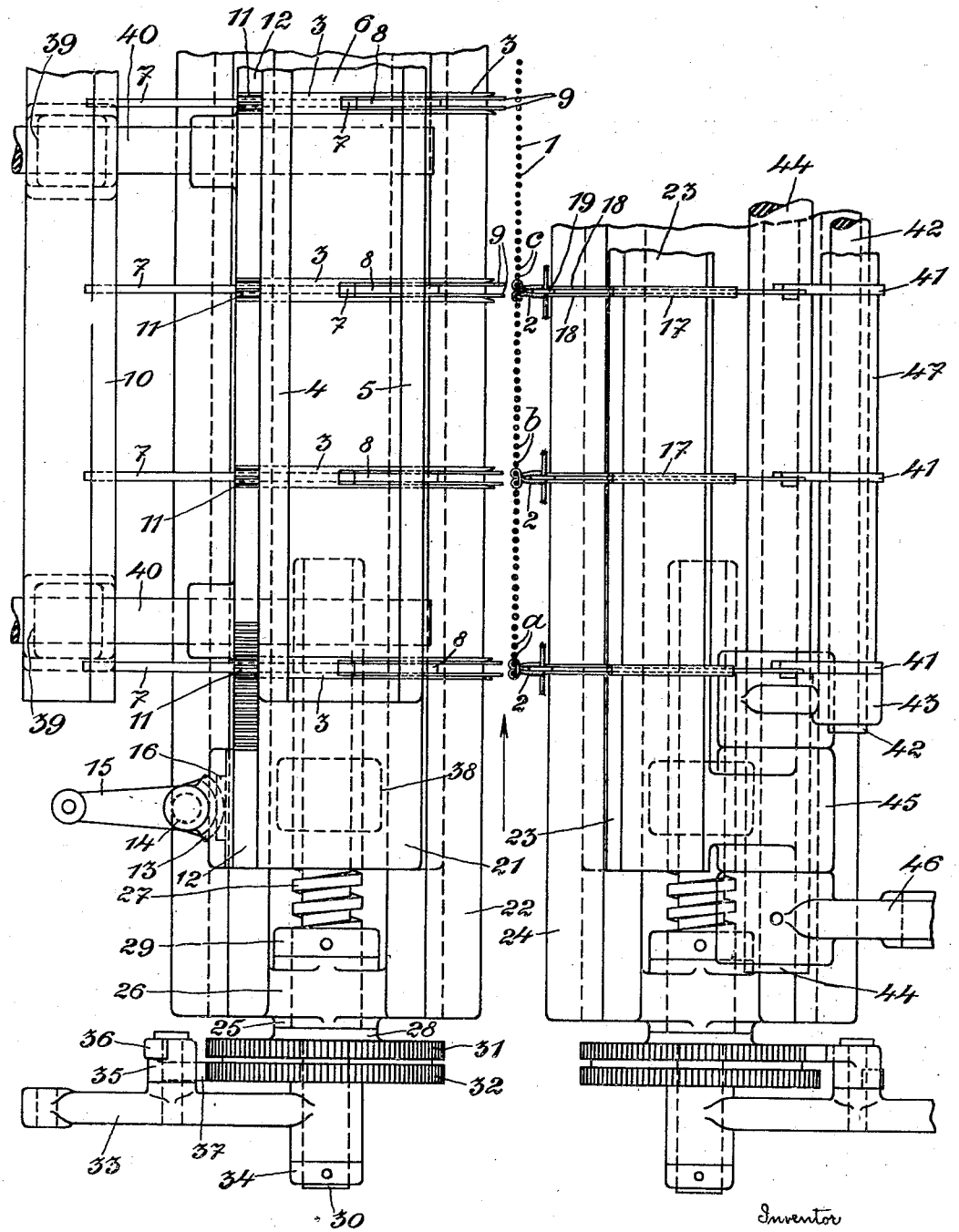

Figure 1 is a side elevation showing positions of the catcher and of the knotter when at rest and the feeder in the starting position, Fig. 2 is a side elevation showing the feeder in front of a warp thread and the catcher in the catching position, Fig. 3 is a side elevation showing the catcher after having engaged the pile thread, the knotter being swung forward, Figs. 4, 5 and 6 are side elevations showing the engagement of the catcher and the grasping of the pile thread by the knotter, Fig. 7 is a side elevation showing the formation and the tying of the pile knot, Fig. 8 is a front elevation showing the position when the pile knot is grasped, Fig. 9 is a plan view showing the position when the pile knot is grasped, Fig. 10 is a plan view showing the position of the catcher as in Fig. 3, Fig. 11 is a plan view of the catcher rotated 90° as in Fig. 4, Fig. 12 is a plan view of the catcher rotated 180° and the knotter in its grasping operation, as in Fig. 6, Fig. 13 is a plan view showing the formation of the pile knot as in Fig. 7, Fig. 14 is a plan view showing the relative position of rack and gear wheels, Fig. 15 is a partial rear elevation showing the gear wheels and rack, Fig. 16 is a partial rear elevation showing the arrangement and movement of the rack, Fig. 17 is a side elevation showing the arrangement of the catchers and knotters, and Fig. 18 is a plan view showing the arrangement of the members for forming the knots successively.

Warp threads are referred to throughout the figures by 1; in the machine for manufacturing knotted carpets they are of course tightly stretched. Pile thread 2 is guided above each pair of the warp threads and tied in a knot.

By means of the working example the operation is clearly illustrated.

As will be seen from Figs. 1 to 7 a catcher sleeve 3 is provided rearwardly of each pair of warp threads. This sleeve is carried in arms 4 and 5 of a U-shaped stationary support 6. The catcher sleeves 3 are slit and are provided at the end of the slit with a central hole for the passage of a catcher rod 7. That part of the catcher rod lying within the slit is of a greater diameter than the rear end thereof. The catcher rod 7 is provided with two flat sides 8 (see Fig. 9) carrying two catchers 9 which, in this manner, are axially operated together by the catcher rod 7. The flat bar 8 of the catcher rod 7 with the catchers 9 completely fill the slit of the catcher sleeve 3 (Figs. 8 and 9) and rotate in a corresponding bore or bearing in the arms 5 of the support 6.

The rearward end of the catcher rod 7 is mounted to turn in an adjustable bent member 10 (Figs. 1 to 5) but is prevented from moving axially therein by means not shown in the drawing. If the bent member 10 is moved in the direction of the arrow (Fig. 2), the catcher rod 7 together with the catchers 9 is moved towards the warp threads 1, if the movement is in the direction of the arrow (Fig. 3), the catcher rod is moved away from the warp threads.

The non-slitted rearward end of the catcher sleeve 3 which projects somewhat beyond the arm 4 in which it is carried is constructed as a pinion 11. As shown in Fig. 14 a rack bar 12 meshes simultaneously with the pinion 11 of each catcher sleeve 3. The catcher sleeves are arranged side by side. The rack bar 12 is actuated by a toothed segment 13 keyed on a rotating spindle 14 and a lever arm 15 which may be turned to the left or to the right. On one side of the rack bar 12 there is a small rack 16 rigidly connected thereto and into the teeth of which mesh the teeth of the segment 13 (Figs. 14 and 16) thus transmitting the movement of the segment to the rack bar 12.

In front of the warp threads 1 are disposed in the usual manner, front swinging knotting tools 17 (see Figs. 1 to 7), which may be swung in the direction of the arrow in Fig. 6 towards the warp threads and away from them. Between spring clips 18 of these knotting tools 17 are arranged in a guide rail knotters 19 (Figs. 1 to 7), the movement of which is represented in Figs. 17 and 18.

Figs. 14, 15 and 16 show how the catcher rods 7 with catchers 9 for group knotting are arranged close together. The knotters 19 arranged in front of them may be correspondingly placed.

Figs. 17 and 18 show in elevation and in plan the arrangement of the knotting members intended for tying the knots successively.

Parts of the knotting members are fixed on a catcher carriage 21 and other parts thereof on a knotter carriage 23. The catcher carriage slides in a guide 22 and the knotter carriage slides in a guide 24. The movements of both carriages are the same. The description is hereinafter limited to the movement of the catcher carriage.

In a bearing 25 (Fig. 18) of a guide wall 26 is arranged a rotating spindle 27 which is prevented from an axial displacement by a shoulder 28 and by a fixed adjusting ring 29. In front of the shoulder 28, keyed on a spindle extension 30, are two ratchet wheels 31 and 32, the teeth of one transmitting motion to the left and the other to the right. An oscillating ratchet lever 33 is placed in front of the ratchet wheels and is prevented from slipping by an adjusting ring 34. On the side of the ratchet lever 33 there is a rocker sleeve 35 provided with pawls 36 and 37 which are oppositely disposed and of which either one at a time is engaged with the corresponding ratchet wheel by means of a suitable spring or otherwise. Owing to the upward and downward movement of the ratchet lever 33 owing to the corresponding adjusting of the pawls 36 and 37 respectively the spindle 27 will either be turned to the left or to the right. The catcher carriage 21 thereby is moved forward or backward, as a spindle nut 38 is fixed rigidly below said carriage and the spindle traverses the said nut. The catcher carriage travels at the same speed during its forward and backward movements which are of equal length.

The axial movements of the catchers 9 and the knotters 19 are shown in Figs. 17 and 18.

The bent member 10 is rigidly fixed to a carrier 39 which itself is rigidly fixed to guide rods 40. The rods 40 slide axially in the catcher carriage 21 and a forward or backward displacement of the guide rods 40 cause a corresponding movement of the catchers 9. The knotting tools 17 are fixed rigidly in corresponding slits in a carriage 23 and are constructed to swing together with the latter. At the extremity of each knotter 19 there is a hinge member 41 which is arranged rotatably on the bar 42. The latter is arranged rigidly in the levers 32 and 43 suitably spaced, and which are rigidly connected with the shaft 44, journaled in bearings 45 provided on the knotter carriage 23. A lever 46 is rigidly arranged on the extremity of the shaft 44 and a swinging movement of the lever 46 causes a swinging movement of the levers 43 thereby effecting the forward and backward movement of the knotters 19. In securing the appropriate distance between the hinged members 41 spacer members 47 are provided which are fitted on the bar 42.

The pile thread 2 is swung in the usual manner by a feed member 20 (Figs. 1, 2 and 9) in the direction of the arrow, Fig. 1, into the position shown in Fig. 2, so that the pile thread which as usual is prepared for being caught, is brought within the reach of the catchers 9. By a movement of the bent member 10 in the direction of the arrow, Fig. 2, the catchers 9 will be displaced above a pair of warp threads below the pile thread 2 and by sufficient lowering of feed member 20 turned over to the catchers 9 (see Figs. 2, 8 and 9). The catchers 9 will thereupon return in the position as shown in Fig. 3 taking along the ends of the pile thread 2 and grasping it resiliently as shown in Fig. 10. A movement of the rack bar 12, which gears with the pinions of the catcher sleeves 3, will cause these pinions together with the catchers 9 to rotate approximately 180°, and to be shifted from the position shown in Fig. 3, through that shown in Fig. 4, rotated 90°, to the position shown in Fig. 5 taking along both ends of the pile thread which in this manner are crossed behind each pair of warp threads 1. It will therefore be seen that there is a rotation of the pile thread from the position in Fig. 10 to that of Fig. 11 and thereafter to the position shown in Fig. 12.

In the meantime the front knotting tools 17 swing from the position of Fig. 1 in the positions as shown in Figs. 3 to 5, and the knotters 19 will slide between a pair of warp threads 1 and below the corresponding cross of the pile threads (see Figs. 6 and 12). On their return stroke the knotters 19 will take along the ends of the pile threads 2, the catchers releasing them (Fig. 7) so that a known carpet knot (Figs. 7 and 13) is formed. Thereupon the knotters 19 will disengage the ends of the knot which now will form the carpet pile, and the knotting tools 17 will return to their initial positions whilst simultaneously the catcher sleeves 3 owing to a corresponding motion of the tooth segment 13 will be turned back so that the working operation just described begins anew.

In the case of successive knotting (Figs. 17 and 18) the movements for the knotting operation are the same as those for the hereinbefore described working operation for group knotting. After the knotting in accordance with Fig. 18 has been finished the movement of the spindle as already described will displace the knotting members (in the direction of the arm of Fig. 18 and also in the opposite direction) over a pair of warp threads, for instance, over the warp thread pairs a, b, c, of Fig. 18 and so forth until the whole series has been provided with knots.

If the bent members 10 and the arms 4 and 5 of the support 6 are provided with bores for the close arrangement of the catchers similar to Fig. 14 and if the rack bar 12 is toothed over its whole length the necessary catchers for group knotting may be inserted if the division of the warp threads has been arranged accordingly. Manifestly the carriage 23 must be provided with the required slits for securing the knotting tools 17 and the corresponding number of link members 41 must be employed, and the spacer members 47 replaced by perforated disks of corresponding diameter.

For group knotting the spindle movement will be reduced or stopped entirely.

What I claim is:

1. In a machine for the manufacture of knotted carpets, knotting tools including a catcher and a knotter, means for moving one of said tools for engaging a pile thread to draw the same over predetermined warp threads, means for turning said tool after the same has drawn the pile thread over the predetermined warp threads thereby crossing the ends of the pile thread, and means for then moving the other tool to engage the crossed pile thread to draw the same between said warp threads, thereby tying the pile thread to the warp threads.

2. In a machine for the manufacture of knotted carpets, knotting tools including a catcher and a knotter, means for moving a pile thread into position relatively to a plurality of warp threads in a common plane, means for moving one of said knotting tools for engaging the pile thread to draw the same over a predetermined set of warp threads without moving the warp threads from their common plane, means for turning said tool after the same has drawn the pile thread over the set of warp threads thereby crossing the ends of the pile thread, and means for then moving the other tool to engage the crossed pile thread to redraw the same between the said set of warp threads, thereby tying the pile thread to the warp threads.

3. In a machine for the manufacture of knotted carpets, knotting tools including a catcher and a knotter, means for moving the catcher for engaging a pile thread to draw the same over a pair of warp threads, means for turning the said catcher after the same has drawn the pile thread over the warp thread thereby crossing the ends of the pile thread, and means for then moving the knotter to engage the crossed pile thread to draw the same back between the said warp threads, thereby tying the pile thread to the warp threads.

4. In a machine for the manufacture of knotted carpets, knotting tools including a catcher, a knotter and a feeder for moving a pile thread into position relatively to a series of warp threads in a common plane, means for moving the said catcher to engage the pile thread to draw the same over a set of warp threads while in their common plane, means for turning the said catcher after the same has been drawn over the said set of warp threads thereby crossing the ends of the pile thread, and means for then moving the said knotter for engaging the crossed pile thread to draw the same between the said set of warp threads, thereby tying the pile thread to the warp threads.

5. In a machine for the manufacture of knotted carpets, knotting tools including a catcher, a knotter and means for feeding a pile thread to position, the catcher being on one side of a chain of warp threads in a common plane and the knotter, together with the means for feeding the pile thread to position, being on the other side of the warp threads, means for moving the catcher between predetermined warp threads to engage the pile thread and draw the same over a set of warp threads, means for then turning the catcher thereby crossing the ends of the pile thread, and means for moving the knotter between the said set of warp threads to engage the crossed pile thread and redraw the same between the set of warp threads to thereby tie the pile thread to the warp threads.

6. In a machine for the manufacture of knotted carpets, knotting tools including a catcher, a knotter and a feeder for moving a pile thread into position, the catcher lying on one side of a plurality of warp threads in a common plane and the feeder and the knotter lying on the opposite side of the said warp threads, means for moving the catcher between predetermined warp threads to engage the pile thread and to draw the pile thread over a pair of warp threads without moving the warp threads from their common plane, means then operative to turn the catcher thereby crossing the ends of the pile thread, and means for then moving the knotter between the said pair of warp threads to engage the crossed pile thread and redraw the same between the said pair of warp threads, thereby tying the pile thread to the warp threads.

7. In a machine for the manufacture of knotted carpets, knotting tools including a catcher, a knotter and a feeder for moving a pile thread into position relatively to a plurality of warp threads in a common plane, means for reciprocating the catcher and also turning the same to cause the catcher to first pass between predetermined warp threads to engage the pile thread and draw the pile thread over a set of warp threads after which the catcher turns a semi-revolution thereby crossing the ends of the pile thread, and means for reciprocating the knotter causing the same to pass between the set of warp threads to engage the crossed pile thread and redraw the pile thread between the set of warp threads, thereby tying the pile thread to the warp threads.

8. In a machine for the manufacture of knotted carpets, a rod, a set of catcher members carried by the said rod, a bearing for the said rod and catcher members, means for reciprocating the rod and catcher members to pass the catcher members between predetermined warp threads to engage a pile thread and to draw the pile thread over a set of warp threads, means then operative to turn the rod and catcher members, with the pile thread engaged thereby, a semi-revolution thereby crossing the ends of the pile thread, a knotter, and means for reciprocating the knotter to move the same between the set of warp threads to engage the crossed pile thread and to draw the same between the set of warp threads, thereby tying the pile thread to the warp threads.

9. In a machine for the manufacture of knotted carpets, a rod, a pair of catchers mounted in oppositely disposed grooves in the said rod, a sleeve in which the said rod and catchers are mounted to slide, a bearing in which the said sleeve is mounted to turn, means for reciprocating the said rod and catchers in the sleeve causing the catchers to pass between predetermined warp threads to engage a pile thread and to draw the same around a set of warp threads, means operative upon the return of the catchers for turning the sleeve, rod and catchers a semi-revolution thereby crossing the ends of the pile thread, a knotter, and means for reciprocating the knotter causing the same to move between the set of warp threads to engage the crossed pile thread to draw the pile thread between the set of warp threads to thereby tie the pile thread to the warp threads.

10. In a machine for the manufacture of knotted carpets, a rod, a pair of catchers mounted in oppositely disposed grooves in the said rod, a sleeve in which the said rod and catchers are mounted to reciprocate, a bearing in which the said sleeve is journaled to turn, the said rod and catchers being on one side of a series of warp threads in a common plane, means for reciprocating the rod and catchers causing the catchers to move between predetermined warp threads and engage a pile thread and to draw the pile thread over a set of warp threads, a pinion carried by the said sleeve, a rack engaging the pinion, means for operating the rack after the catchers have drawn the pile thread over the set of warp threads to then turn the sleeve and the catchers and rod a semi-revolution thereby crossing the ends of the pile thread, a knotter on the opposite side of the said series of warp threads, and means for reciprocating the knotter to cause the same to pass between the set of warp threads to engage the crossed pile thread to withdraw the pile thread between the set of warp threads to tie the pile thread to the warp thread without moving the warp threads from their common plane.

In testimony whereof I have signed my name to this specification.

ALBERT BLUM.